(12) United States Patent
Park

(10) Patent No.: US 8,004,746 B2
(45) Date of Patent: Aug. 23, 2011

(54) ELECTROPHORETIC DISPLAY DEVICE AND METHOD FOR MANUFACTURING THE SAME

(75) Inventor: Sung Jin Park, Daegu-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/836,276

(22) Filed: Jul. 14, 2010

(65) Prior Publication Data

US 2011/0149378 A1    Jun. 23, 2011

(30) Foreign Application Priority Data

Dec. 18, 2009    (KR) .................. 10-2009-0126502

(51) Int. Cl.
G02B 26/00 (2006.01)
G09G 3/34 (2006.01)
G03G 13/00 (2006.01)

(52) U.S. Cl. ..................... 359/296; 345/107; 430/31
(58) Field of Classification Search .............. 359/296; 430/31–32; 345/107; 349/33
See application file for complete search history.

(56) References Cited

U.S. PATENT DOCUMENTS

2009/0206339 A1*  8/2009  Park et al. ............... 257/59
2010/0163881 A1   7/2010  Kang et al.

FOREIGN PATENT DOCUMENTS

WO   WO 2005/045509 A2   5/2005

* cited by examiner

Primary Examiner — Dawayne A Pinkney
(74) Attorney, Agent, or Firm — McKenna Long & Aldridge LLP

(57) ABSTRACT

Disclosed is an electrophoretic display device and a method for manufacturing the same, which facilitate high reflectivity, high contrast ratio and easy removal of line-shaped spots occurring when a release film is removed from an electrophoretic film. The electrophoretic display device comprising a substrate; a gate line, a data line, a storage electrode and a switching element on the substrate; a first passivation film on the gate line, data line, storage electrode, switching element and substrate, the first passivation film including first and second regions, the first region corresponding to the gate line, data line and switching element, the second region being a region other than the first region; a plurality of first dielectric patterns on the second region, the plurality of first dielectric patterns being apart from one another; a pixel electrode on the plurality of first dielectric patterns; and an electrophoretic film on the pixel electrode.

18 Claims, 6 Drawing Sheets

ELECTROPHORETIC DISPLAY DEVICE AND METHOD FOR MANUFACTURING THE SAME

CROSS REFERENCE TO RELATED APPLICATIONS

This application claims the benefit of the Korean Patent Application No. 10-2009-0126502 filed on Dec. 18, 2009, which is hereby incorporated by reference as if fully set forth herein.

BACKGROUND OF THE INVENTION

1. Field of the Invention

The present invention relates to an electrophoretic display device and a method for manufacturing the same.

2. Discussion of the Related Art

An electrophoretic display device is one of flat panel display devices, which is typically used for manufacturing an electronic book (e-book). The electrophoretic display device includes an electrophoretic film and a TFT substrate for driving the electrophoretic film pixel-by-pixel.

The electrophoretic display device is provided with an electrophoretic dispersion solution between two electrodes confronting each other. In a microcapsule type, a plurality of microcapsules containing electrophoretic dispersion solution are interposed between the two electrodes. In a microcup type, the electrophoretic dispersion solution is divided into the pixels by partitions. When a voltage is applied to the two electrodes confronting each other, the colored charged particles in the electrophoretic dispersion liquid moves to the electrode whose polarity is opposite to that of the colored charted particles, thereby displaying an image.

The bistability of the electrophoretic display device enables the device to keep the displayed image maintained for a long time after the voltage applied between the two electrodes is removed. That is, even though there is no continuous supply of the voltage to the electrophoretic display device, the displayed image can be maintained thereon for a long time. In this respect, the electrophoretic display device is especially appropriate for the electronic book (e-book) which does not require a rapid image stream. Unlike a liquid crystal display device, the electrophoretic display device has no dependence on viewing angle. In addition, the electrophoretic display device can provide an image having such good quality as to make a user feel comfortable without suffering from eye strain. That is, the electrophoretic display device provides paper-like viewing comfort.

Generally, the electrophoretic display device is manufactured by laminating an electrophoretic film on a TFT substrate. As an electrophoretic film is distributed with a release film adhered thereto, it is necessary to remove the release film from the electrophoretic film just before the laminating process. In this case, the static electricity generated when the release film is removed affects the charged particles included in the electrophoretic film and causes line-shaped spots on the electrophoretic film. The line-shaped spots often remains even after the initial driving of the electrophoretic display device.

SUMMARY OF THE INVENTION

Accordingly, the present invention is directed to an electrophoretic display device and a method for manufacturing the same that substantially obviates one or more problems due to limitations and disadvantages of the related art.

[Column 2]

An advantage of the present invention is to provide an electrophoretic display device, which facilitate high reflectivity, high contrast ratio and easy removal of line-shaped spots occurring when a release film is removed from an electrophoretic film.

Another advantage of the present invention is to provide a method for manufacturing an electrophoretic display device facilitating high reflectivity, high contrast ratio and easy removal of line-shaped spots occurring when a release film is removed from an electrophoretic film.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an electrophoretic display device comprising a substrate; a gate line, a data line, a storage electrode and a switching element on the substrate; a first passivation film on the gate line, data line, storage electrode, switching element and substrate, the first passivation film including first and second regions, the first region corresponding to the gate line, data line and switching element, the second region being a region other than the first region; a plurality of first dielectric patterns on the second region, the plurality of first dielectric patterns being apart from one another; a pixel electrode on the plurality of first dielectric patterns; and an electrophoretic film on the pixel electrode.

In another aspect of the present invention, there is provided a method for manufacturing an electrophoretic display device comprising forming a gate line, a data line, a storage electrode, and a switching element on a substrate; forming a first passivation film on the gate line, data line, storage electrode, switching element and substrate, the first passivation film including first and second regions, the first region corresponding to the gate line, data line and switching element, the second region being a region other than the first region; forming a plurality of first dielectric patterns on the second region in such a way that the plurality of first dielectric patterns are apart from one another; forming a pixel electrode on the plurality of first dielectric patterns; and forming an electrophoretic film on the pixel electrode.

In yet another aspect of the present invention, there is provided an electrophoretic display device comprising a substrate; a switching element on the substrate; a storage electrode on the substrate; a first passivation film on the switching element and storage electrode, the first passivation film including a first region corresponding to the switching element and a second region corresponding to the storage electrode; and a plurality of first dielectric patterns on the second region, the plurality of first dielectric patterns being apart from one another; a pixel electrode on the plurality of first dielectric patterns; and an electrophoretic film on the pixel electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an electrophoretic display device according to the present invention and a method for manufacturing the same will be described with reference to the accompanying drawings.

The technical features of the present invention can be applied to all electrophoretic display devices regardless of whether or not to realize a colored image. For convenience of explanation, an example of a monochrome electrophoretic display device for displaying a black-and-white image will be explained as follows. However, the following technical features of the present invention can be readily applied to an electrophoretic display device with red-colored, green-colored, blue-colored, or white-colored charged particles in an electrophoretic dispersion liquid, as well as an electrophoretic display device with a color filter.

In addition, the technical idea of the present invention can be readily applied to both a microcup-type electrophoretic display device and a microcapsule-type electrophoretic display device. For convenience of explanation, an example of the microcapsule-type electrophoretic display device will be explained as follows.

For the following description of the embodiments of the present invention, if a first structure is described as being formed "on" or "under" a second structure, the first and second structures may come in contact with each other, or there may be a third structure interposed between the first and second structures. However, if the first structure is described as being formed "right on" or "right under" the second structure, it is limited to the case where the first and second structures are in contact with each other.

Figure 1:
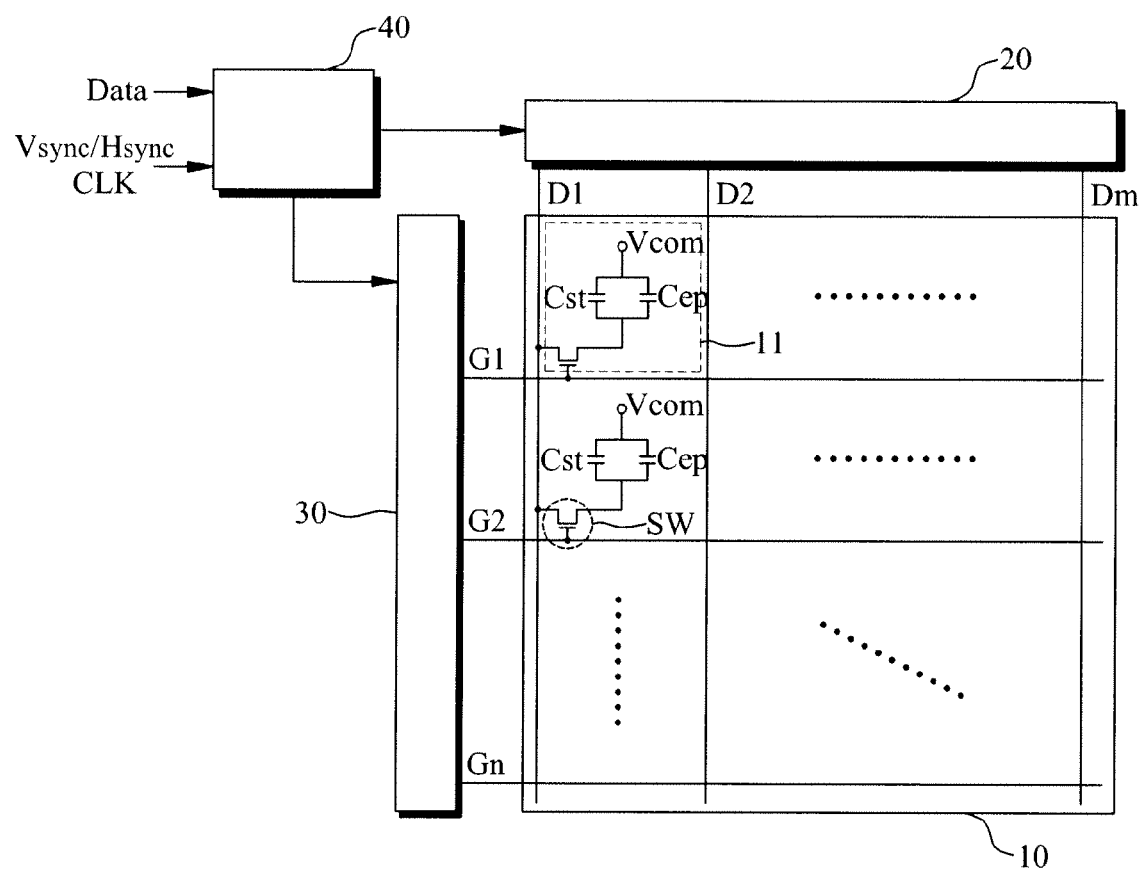
FIG. 1 is a block diagram illustrating an electrophoretic display device according to one embodiment of the present invention.

FIG. 1 is a block diagram illustrating an electrophoretic display device according to one embodiment of the present invention.

As shown in FIG. 1, the electrophoretic display device according to one embodiment of the present invention includes an electrophoretic display panel 10, a data driver 20, a gate driver 30, and a timing controller 40.

On the electrophoretic display panel 10, a plurality of gates lines G1 to Gn and data lines D1 to Dm are formed in such a way that the gate and data lines cross at right angles to each other, that is, are perpendicular to each other. Thus, 'm×n' pixels 11 are defined by the gate lines G1 to Gn and data lines D1 to Dm crossing at right angles to each other, whereby the pixels 11 are arranged in a matrix configuration. Also, a plurality of switching elements SW are formed at the positions corresponding to the crossing points of the gate lines G1 to Gn and data lines D1 to Dm. The switching element SW may be a thin film transistor TFT. Herein, an example of the electrophoretic display device using a thin film transistor TFT as a switching element SW will be explained in detail. Each switching element SW includes a gate electrode, a source electrode, and a drain electrode, wherein the gate electrode is connected with one of the gate lines G1 to Gn; the source electrode is connected with one of the data lines D1 to Dm; and the drain electrode is connected with a pixel electrode of the corresponding pixel 11.

When a scan pulse is supplied to the switching elements SW connected with one of the gate lines G1 to Gn through the gate line, the switching elements SW are turned-on in response to the scan pulse, whereby data voltages supplied through the data lines D1 to Dm are applied to the pixel electrodes of the corresponding pixels 11.

A pixel electrode, together with a common electrode, forms an electrophoretic capacitor $C_{ep}$. The pixel electrode, together with a storage electrode, forms a storage capacitor $C_{st}$ as well.

Between the pixel electrode and the common electrode exist an electrophoretic dispersion solution containing colored charged particles. Thus, if the data voltage and a common voltage $C_{com}$ are respectively applied to the pixel electrode and the common electrode, the colored charged particles included in the electrophoretic dispersion solution move to the electrodes with the opposite polarities by electrophoresis, thereby displaying an image in the corresponding pixel 11.

When supplying a gate voltage to the gate electrode is stopped, a voltage drop occurs due to a parasitic capacitance in the switching element SW. The voltage drop is generally referred to as "kickback voltage". Since the kickback voltage adversely influences a contrast ratio, it may cause a deterioration of display quality, and more particularly, a deterioration of display quality in a still image. The storage capacitor $C_{st}$ may prevent the display quality from being deteriorated due to the kickback voltage.

The data driver 20 is also referred to as a source driver. Under control of the timing controller 40, the data driver 20 supplies data voltages to the data lines D1 to Dm for displaying a desired grayscale.

The gate driver 30 is also referred to as a scan driver. Under control of the timing controller 40, the gate driver 30 supplies a scan pulse to the gate lines G1 to Gn for controlling the switching operation of the switching elements SW.

The timing controller 40 receives horizontal/vertical synchronization signals Vsync/Hsync and a clock signal CLK from an external graphic controller (not shown); and generates a control signal for controlling an operation timing of the data driver 20 and gate driver 30. Also, the timing controller 40 receives video data from the external graphic controller; determines a driving waveform of the data voltage corresponding to the received video data through the use of a lookup table, a frame counter and so on; and transmits digital data corresponding to the determined driving waveform of the data voltage to the data driver 20.

A detailed structure of the electrophoretic display device according to one embodiment of the present invention will be described with reference to FIGS. 2 and 3.

Figure 2:
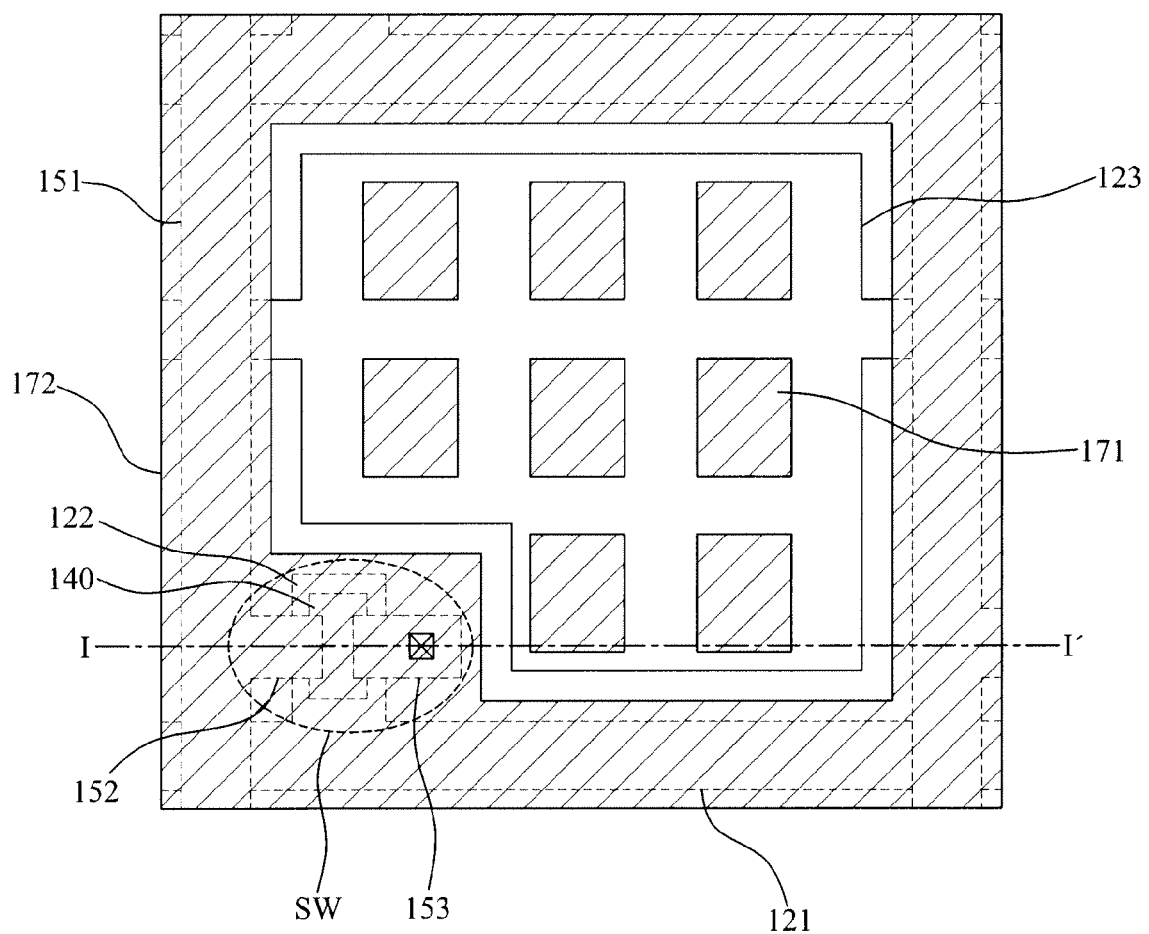
FIG. 2 is a plane view illustrating an electrophoretic display device according to one embodiment of the present invention.

FIG. 2 is a plane view illustrating the electrophoretic display device according to one embodiment of the present invention. FIG. 3 is a cross section view along I-I' of FIG. 2.

The electrophoretic display device according to one embodiment of the present invention includes a substrate 110. The substrate 110 may be a glass substrate, or a plastic or metal substrate for providing flexibility to the electrophoretic display device. According as the substrate 110 is positioned in opposite to an image-displaying face, there is no necessity for the substrate 110 to have transparency.

A gate line 121, a gate electrode 122 extended from the gate line 121, and a storage electrode 123 are formed on the substrate 110. Each of the gate line 121, the gate electrode 122, and the storage electrode 123 may have a single-layered structure of a low-resistivity material, e.g., argentums (Ag), aluminum (Al), or alloy thereof; or may have a multi-layered structure with a layer of a material with a great electrical property such as chrome (Cr), titanium (Ti), or tantalum (Ta), in addition to the aforementioned low-resistivity material layer.

A gate insulating layer 130 is formed on an entire area of the substrate 110 including the gate line 121, the gate electrode 122, and the storage electrode 123. The gate insulating layer 130 may be a silicon nitride SiNx layer (hereinafter, referred to as "nitride layer").

On the gate insulating layer 130, there are a semiconductor layer 140, a data line 151, a source electrode 152, and a drain electrode 153 extended from the data line 151.

The semiconductor layer 140 is formed on a predetermined portion of the gate insulating layer 130 above the gate electrode 122.

The data line 151 and the gate line 121 cross at right angles to each other, that is, the data line 151 is perpendicular to the gate line 121. The source electrode 152 is formed at a predetermined interval from the drain electrode 153, and both the source and drain electrodes 152 and 153 are partially overlapped with the semiconductor layer 140. Each of the data line 151, the source electrode 152, and the drain electrode 153 may have a single-layered structure of a low-resistivity material layer such as argentums (Ag), aluminum (Al), or an alloy thereof; or may have a multi-layered structure with a layer using a material with the great electrical properties such as chrome (Cr), titanium (Ti), or tantalum (Ta), in addition to the aforementioned low-resistivity material layer.

Although not shown, ohmic contact layers may be additionally formed between the source electrode 152 and the semiconductor layer 140, and between the drain electrode 153 and the semiconductor layer 140.

The gate electrode 122, the gate insulating layer 130, the semiconductor layer 140, the source electrode 152, and the drain electrode 153 constitute a switching element SW.

A first passivation film 160 is formed on the data line 151, switching element SW, and gate insulating layer 130. The first passivation film 160 may be a nitride layer. The first passivation film 160 includes first and second regions. The first region of the first passivation film 160 corresponds to the gate line 121, data line 151, and switching element SW; and the second region of the first passivation film 160 is a region other than the first region. That is, the second region corresponds to a portion of the substrate 110 on which none of the gate line 121, data line 151, and switching element SW is formed. At least a portion of the second region corresponds to the storage electrode 123.

Figure 3:
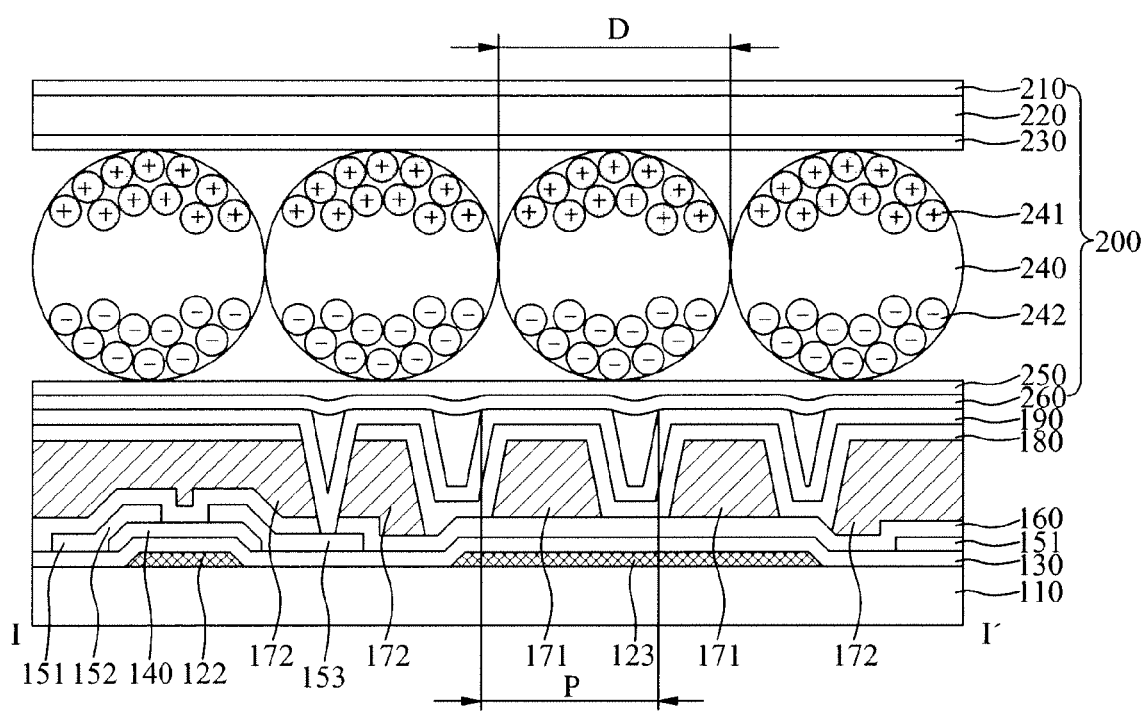
FIG. 3 is a cross section view along I-I' of FIG. 2.

Although the storage electrode 123 of the electrophoretic display device according to one embodiment of the present invention as illustrated in FIGS. 2 and 3 is not electrically connected to the drain electrode 153, a storage electrode of the present invention can be electrically connected to the drain electrode 153. In that case, the storage electrode can be formed on the gate insulating layer 130 simultaneously with the drain electrode 153.

A plurality of first dielectric patterns 171 are formed on the second region of the first passivation film 160. A second dielectric pattern 172 is formed on the first region of the first passivation film 160. The first and second dielectric patterns 171 and 172 may be formed of an organic material with a low dielectric constant, for example, photoacryl, polyimide, or poly(4-vinylphenol). Each of the first and second dielectric patterns 171 and 172 has about 1 to 5 μm thickness.

A second passivation film 180 and the pixel electrode 190 are sequentially formed on the first and second dielectric patterns 171 and 172 and the first passivation film 160. The pixel electrode 190 is electrically connected with the drain electrode 153 through a through-hole passing through the first passivation film 160, the second dielectric pattern 172, and the second passivation film 180.

The second passivation film 180 may be a nitride film. The pixel electrode 190 may be formed of copper, aluminum, or ITO. Since the material of the pixel electrode 190 shows poor adhesion to the material of the dielectric patterns 171 and 172, it might be necessary to interpose the second passivation film 180 made of silicon nitride between the dielectric patterns 171 and 172 and the pixel electrode 190. If the pixel electrode 190 is formed of metal, the pixel electrode 190 may be damaged by outgas generated from the dielectric patterns 171 and 172 formed of organic material. In this respect, it might be necessary to interpose the second passivation film 180 between the dielectric patterns 171 and 172 and the pixel electrode 190.

For improving reflectivity of the electrophoretic display device, the pixel electrode 190 should be maximized in its size. Thus, according to the present invention, the pixel electrode 190 has such a large size as to overlap with the gate line 121, the data line 151, and the switching element SW.

If the pixel electrode 190 of the electrophoretic display device is overlapped with the gate line 121, the data line 151, and the switching element SW as illustrated in the exemplary embodiment of the present invention, a considerable amount of kickback voltage generates. This kickback voltage influences a contrast ratio causing deterioration of display quality, and more particularly, deterioration of display quality in the still image. In order to minimize the kickback voltage, it is required to minimize the parasitic capacitance $C_{gp}$ between the gate line 121 and the pixel electrode 190, and the parasitic capacitances $C_{dp}$ between the data line 151 and the pixel electrode 190.

For minimizing the parasitic capacitances $C_{dp}$ and $C_{gp}$, the electrophoretic display device according to the present invention includes the second dielectric pattern 172 on the first region of the first passivation film 160. The second dielectric pattern 172 is formed of the organic material with the low dielectric constant, for example, photoacryl. Since the second dielectric pattern 172 made of the material with the low dielectric constant is interposed between the gate line 121 and the pixel electrode 190, and between the data line 151 and the pixel electrode 190, the parasitic capacitances $C_{dp}$ and $C_{gp}$ can be significantly decreased. Thus, the electrophoretic display device according to the present invention can have a high reflectivity, and also can display a still image with a high contrast ratio.

As a driving voltage required for an electrophoretic display device is relatively higher than a driving voltage used in any other flat display device, the switching element SW for the electrophoretic display device has to be relatively large. As a result, the parasitic capacitances $C_{gs}$ and $C_{gd}$ are respectively increased between the gate electrode 122 and the source electrode 152, and between the gate electrode 122 and the drain electrode 153, and thus the kickback voltage is also increased. For minimizing the kickback voltage due to the parasitic capacitances $C_{gs}$ and $C_{gd}$, it is necessary to ensure a sufficient storage capacitance.

In terms of a sufficient storage capacitance, it is not preferable to dispose a material with a low dielectric constant between the storage electrode 123 and the pixel electrode 190. In this respect, a structure may be proposed which has no dielectric pattern between the storage electrode 123 and the pixel electrode 190. In case of the proposed structure which has no dielectric pattern between the storage electrode 123 and the pixel electrode 190, however, the pixel electrode 190 would have a step due to the second dielectric pattern 172 with about 1 to 5 µm thickness. If an electrophoretic film 200 is attached to the pixel electrode 190 having the step, the charged particles positioned on a relatively-lowered portion of the pixel electrode 190 might be too distant from the pixel electrode 190 to be provided with a sufficient driving voltage. This problem becomes more serious when line-shaped spots occur in the electrophoretic film 200 due to static electricity generated when a release film is removed from the electrophoretic film 200. If the sufficient driving voltage is not supplied to the charged particles having moved due to the static electricity, the spots remain on the electrophoretic film 200.

According to the present invention, since the plurality of first dielectric patterns 171 are formed at fixed intervals on the second region of the first passivation film 160, it is possible to ensure the storage capacitance sufficient to minimize the kickback voltage as well as to apply the sufficient voltage to the charged particles 241 and 242 included in the electrophoretic film 200.

In more detail, there is no dielectric film between the storage electrode 123 and a first region of the pixel electrode 190, wherein the first region of the pixel electrode 190 indicates a region of the pixel electrode 190 positioned between the first dielectric patterns 171. Meanwhile, a second region of the pixel electrode 190, wherein the second region indicates a region of the pixel electrode 190 positioned on the first dielectric pattern 171, is sufficiently close to microcapsules 240 included in the electrophoretic film 200. That is, a sufficient contact area between the second region of the pixel electrode 190 and the microcapsules 240 can be ensured such that a sufficient driving voltage can be supplied to the microcapsules 240.

If the pitch (P) of first dielectric patterns 171 is too long, there might be microcapsules 240 which are not supplied with the sufficient driving voltage. Thus, according to one embodiment of the present invention, the pitch (P) of the first dielectric patterns 171 is the same as or shorter than a diameter of each microcapsule 240. In this case, the diameter of each microcapsule 240 indicates the length of a longitudinal axis of a cross section of the microcapsule 240, the cross section being in parallel to the substrate 110.

The electrophoretic film 200 of the present invention comprises a base film 210, a common electrode 220, a first passivation layer 230, a plurality of microcapsules 240, a second passivation layer 250, and an adhesive layer 260. The electrophoretic film 200 is distributed with a release film (not shown) adhered to the adhesive layer 260. Thus, just prior to a laminating process for attachment of the electrophoretic film 200 to the TFT substrate, the release film should be removed from the electrophoretic film 200. Through the laminating process, the adhesive layer 260 is adhered to the substrate 110.

The base film 210 may be formed of glass or plastic, and the common electrode 220 may be formed of ITO (Indium Tin Oxide) or IZO (Indium Zinc Oxide). Both the base film 210 and the common electrode 220 are transparent so as to display an image.

The microcapsule 240 has an electrophoretic dispersion solution therein. The electrophoretic dispersion solution includes a dielectric solvent, and positively and negatively charged particles 241 and 242. For ensuring reflective luminance, preferably, the dielectric solvent is formed of a transparent material, for example, water, alcohol-based solvent, ester-based solvent, ketone-based solvent, aliphatic hydrocarbon-based solvent, aromatic hydrocarbon-based solvent, or halogen-based solvent, solely or mixedly. The dielectric solvent may additionally include a surfactant. For high mobility of the charged particles 241 and 242, the dielectric solvent may be used of a material with low viscosity. For example, the charged particles may be black-colored charged parties 241 which are polymer or colloid colored with black-colored pigment such as aniline black or carbon black, and charged to a positive (+) polarity; or may be white-colored charged particles 242 which are polymer or colloid colored with white-colored pigment such as titanium dioxide or antimony trioxide, and charged to a negative (−) polarity. In addition to the aforementioned pigments, charge-controlling agent, charge-dispersing agent, and charge-lubricating agent may be added thereto if needed.

For convenience of explanation, the following description will show an example of electrophoretic dispersion liquid obtained by dispersing the positively-charged black particles 241 and negatively-charged white particles 242 in the colorless dielectric solvent. However, the electrophoretic dispersion liquid capable of being used for the present invention is not limited to the aforementioned one. For example, the electrophoretic display device according to the present invention may use the electrophoretic dispersion liquid obtained by dispersing the white-colored charged particles in the dielectric solvent with the black-colored pigment. In this case, if the data voltage and the common voltage Vcom are respectively applied to the pixel electrode 190 and the common electrode 220, the white-colored charged particles are moved to the electrode with its opposite polarity, thereby displaying the black and white colors. Meanwhile, the electrophoretic display device according to the present invention may use the electrophoretic dispersion liquid obtained by dispersing the black-colored charged particles in the dielectric solvent with the white-colored dye.

A detailed method for manufacturing the electrophoretic display device according to one embodiment of the present invention will be described with reference to FIGS. 4A to 4F.

Figure 4A:
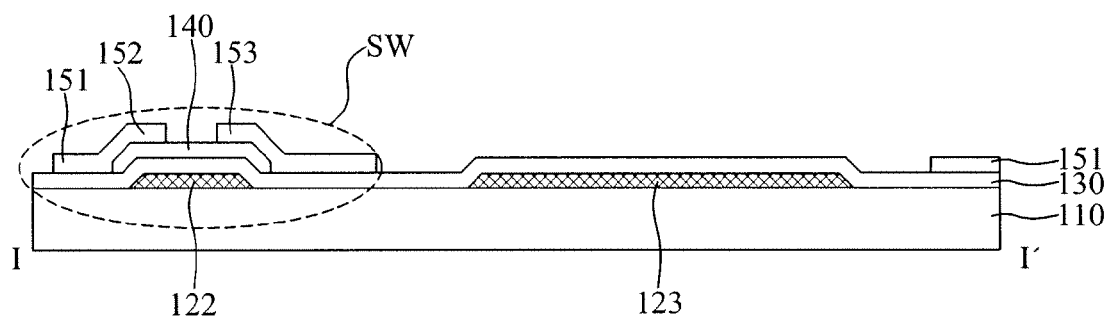
FIGS. 4A to 4F are cross section views illustrating a method for manufacturing an electrophoretic display device according to one embodiment of the present invention.

As shown in FIG. 4A, the gate line (not shown), the data line 151, the switching element SW, and the storage electrode 123 are formed on the substrate 110.

In more detail, the gate line, the gate electrode 122 extended from the gate line, and the storage electrode 123 are formed on the substrate 110. Then, the gate insulating layer 130 is formed on the entire area of the substrate 110 including the gate line, the gate electrode 122, and the storage electrode 123.

Then, the semiconductor layer 140 is formed on the predetermined portion of the gate insulating layer 130 above the gate electrode 122.

The data line 151 is formed on the gate insulating layer 130 in such a way that the data line 151 and the gate line cross at right angles, that is, are perpendicular to each other. Simultaneously, the source and drain electrodes 152 and 153 extended from the data line 151 are formed at the predetermined interval therebetween, wherein both the source and drain electrodes 152 and 153 are partially overlapped with the semiconductor layer 140.

Although not shown, the ohmic contact layer may be additionally formed between the source electrode 152 and the semiconductor layer 140, and also formed between the drain electrode 153 and the semiconductor layer 140.

Figure 4B:
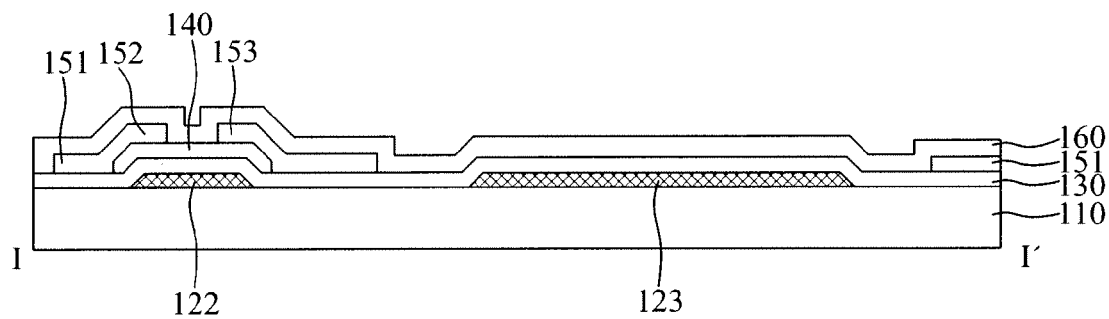

As shown in FIG. 4B, the first passivation film 160 is formed on the gate line, the data line 151, the switching element SW, and the substrate 110. The first passivation film 160 includes the first and second regions. In this case, the first region of the first passivation film 160 is provided in the region with the gate line, the data line 151, and the switching element SW. Also, the second region of the first passivation film 160 corresponds to the remaining region except the first region, that is, the remaining region of the substrate 110 without any of the gate line, the data line 151, and the switching element SW, for example, the region with the storage electrode 123.

Figure 4C:
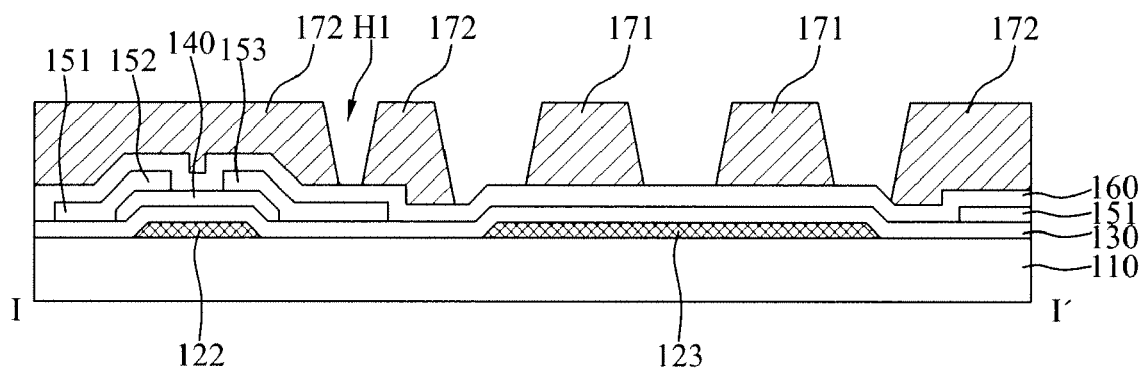

As shown in FIG. 4C, the plurality of first dielectric patterns 171 are formed on the second region of the first passivation film 160; and the second dielectric pattern 172 is formed on the first region of the first passivation film 160.

In more detail, the dielectric film is coated on the entire area of the first passivation film 160. Then, the coated dielectric film is selectively removed by photolithography, whereby the second dielectric pattern 172 having a first hole H1 is formed on the first region of the first passivation film 160, and the first dielectric patterns 171 are formed on the second region of the first passivation film 160. According to one embodiment of the present invention, the dielectric film is selectively removed so that the pitch (P) of the first dielectric patterns 171 is the same as or smaller than the diameter of the microcapsule 240 included in the electrophoretic film 200 to be adhered.

Figure 4D:
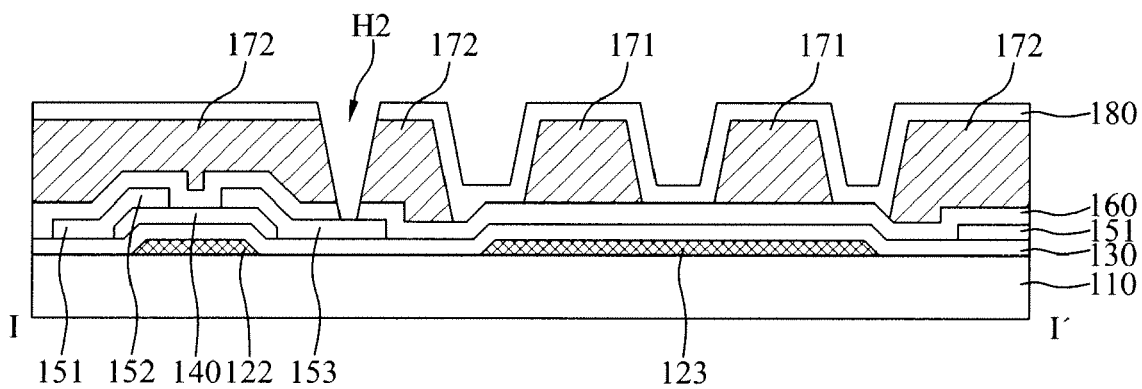

As shown in FIG. 4D, the second passivation film 180 is formed on the entire area of the substrate 110 including the first and second dielectric patterns 171 and 172. For forming a second hole H2 passing through the first and second passivation films 160 and 180 and the second dielectric pattern 172, there is provide a step for selectively removing the first and second passivation films 160 and 180 corresponding to the first hole H1 of the second dielectric pattern 172.

Figure 4E:
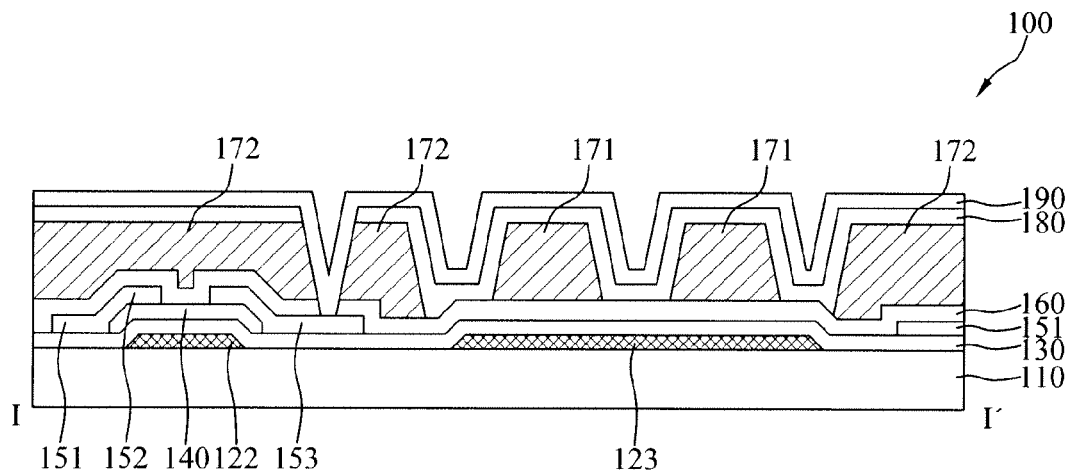

As shown in FIG. 4E, the pixel electrode 190 is formed on the second passivation film 180, wherein the pixel electrode 190 is electrically connected with the drain electrode 153 of the switching element SW through the second hole H2, thereby completing a TFT substrate 100.

Figure 4F:
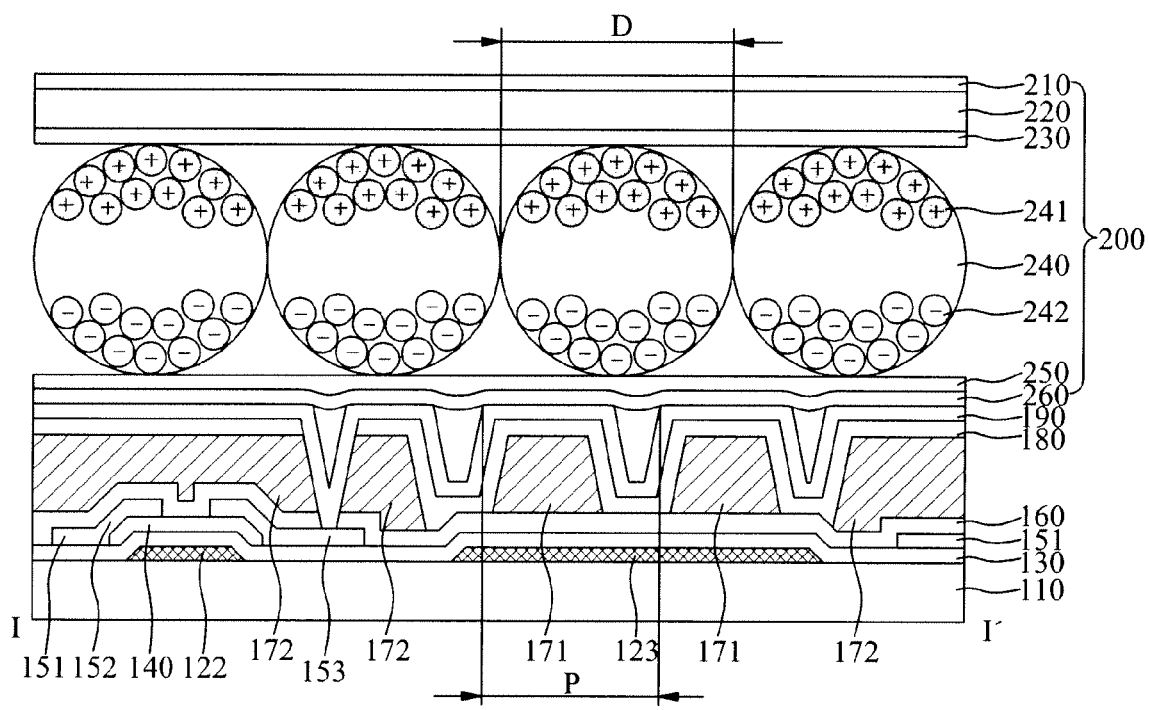

As shown in FIG. 4F, the adhesive layer 260 of the electrophoretic film 200 shown in FIG. 2 is adhered to an upper surface of the TFT substrate 100, that is, the pixel electrode 190, thereby completing the electrophoretic display device.

Accordingly, the electrophoretic display device according to the present invention and the method for manufacturing the same can realize the good picture quality with the improved reflectivity and high contrast ratio; and also effectively remove the line-shaped spots generated when removing the release film from the electrophoretic film 200.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrophoretic display device comprising:
   a substrate;
   a gate line, a data line, a storage electrode and a switching element on the substrate;
   a first passivation film on the gate line, data line, storage electrode, switching element and substrate, the first passivation film including first and second regions, the first region corresponding to the gate line, data line and switching element, the second region being a region other than the first region;
   a plurality of first dielectric patterns on the second region, the plurality of first dielectric patterns being apart from one another;
   a pixel electrode on the plurality of first dielectric patterns; and
   an electrophoretic film on the pixel electrode.

2. The electrophoretic display device according to claim 1, wherein the plurality of first dielectric patterns are formed of an organic material.

3. The electrophoretic display device according to claim 1, wherein the plurality of first dielectric patterns are formed of photoacryl.

4. The electrophoretic display device according to claim 1, further comprising a second dielectric pattern on the first region.

5. The electrophoretic display device according to claim 4, wherein the pixel electrode is formed on both of the first and second dielectric patterns.

6. The electrophoretic display device according to claim 5, further comprising a second passivation film between the pixel electrode and the first and second dielectric patterns.

7. The electrophoretic display device according to claim 5, the electrophoretic film includes microcapsules containing charged particles,
   wherein a pitch of the first dielectric patterns is the same as or shorter than a diameter of the microcapsule.

8. A method for manufacturing an electrophoretic display device comprising:
   forming a gate line, a data line, a storage electrode and a switching element on a substrate;
   forming a first passivation film on the gate line, data line, storage electrode, switching element and substrate, the first passivation film including first and second regions, the first region corresponding to the gate line, data line and switching element, the second region being a region other than the first region;
   forming a plurality of first dielectric patterns on the second region in such a way that the plurality of first dielectric patterns are apart from one another;
   forming a pixel electrode on the plurality of first dielectric patterns; and
   forming an electrophoretic film on the pixel electrode.

9. The method according to claim 8, wherein the plurality of first dielectric patterns are formed of an organic material.

10. The method according to claim 8, wherein the plurality of first dielectric patterns are formed of photoacryl.

11. The method according to claim 8, wherein forming the plurality of first dielectric patterns comprises:
    forming a dielectric film on the first passivation film; and
    selectively removing the dielectric film by photolithography so as to form a second dielectric pattern having a first hole on the first region, and to form the first dielectric patterns on the second region.

12. The method according to claim 11, further comprising:
forming a second passivation film on an entire area of the substrate including the first and second dielectric patterns; and
selectively removing the first and second passivation films corresponding to the first hole of the second dielectric pattern so as to form a second hole passing through the first and second passivation films and the second dielectric pattern,
wherein the pixel electrode is formed on the second passivation film, and the pixel electrode is electrically connected with the switching element through the second hole.

13. The method according to claim 12, wherein forming the electrophoretic film on the pixel electrode is to adhere an electrophoretic film with microcapsules containing charged particles to the pixel electrode,
wherein the selectively removing the dielectric film is performed in such a way that a pitch of the first dielectric patterns is the same as or shorter than a diameter of the microcapsule.

14. An electrophoretic display device comprising:
a substrate;
a switching element on the substrate;
a storage electrode on the substrate;
a first passivation film on the switching element and storage electrode, the first passivation film including a first region corresponding to the switching element and a second region corresponding to the storage electrode; and
a plurality of first dielectric patterns on the second region, the plurality of first dielectric patterns being apart from one another;
a pixel electrode on the plurality of first dielectric patterns; and
an electrophoretic film on the pixel electrode.

15. The electrophoretic display device according to claim 14, wherein the switching element and storage electrode are electrically connected to each other.

16. The electrophoretic display device according to claim 14, further comprising a second dielectric pattern on the first region.

17. The electrophoretic display device according to claim 16, wherein the first and second dielectric patterns are formed of an organic material.

18. The electrophoretic display device according to claim 17, wherein the pixel electrode is formed on both of the first and second dielectric patterns.

* * * * *